United States Patent [19]
Norris

[11] 3,972,379
[45] Aug. 3, 1976

[54] HYDROSTATICALLY DRIVEN VEHICLE
[76] Inventor: Charlie L. Norris, P.O. Box 263, Grove Hill, Ala. 36451
[22] Filed: Mar. 11, 1975
[21] Appl. No.: 557,334

[52] U.S. Cl. .............................. 180/46; 180/66 R; 180/140; 180/151
[51] Int. Cl.² .................................. B62D 17/34
[58] Field of Search ............ 180/79.2 C, 79.1, 66 R, 180/45, 46, 6.24, 6.3

[56] References Cited
UNITED STATES PATENTS

| | | | |
|---|---|---|---|
| 2,558,562 | 6/1951 | Hutton | 180/66 R X |
| 3,064,745 | 11/1962 | Colt et al. | 180/46 X |
| 3,250,340 | 5/1966 | Roberson | 180/66 R X |
| 3,532,178 | 10/1970 | Lindbom | 180/79.2 C |
| 3,825,087 | 7/1974 | Wilson | 180/45 X |

Primary Examiner—M. H. Wood, Jr.
Assistant Examiner—John A. Pekar
Attorney, Agent, or Firm—C. A. Phillips

[57] ABSTRACT

A hydrostatically driven utility vehicle which may be operated with a forward steered direction normal to any one of the four sides of the vehicle. Separate rack and pinion steering assemblies are employed for each wheel, and a shiftable pinion gear for each wheel assembly is remotely controllable to provide selective steering engagement for each wheel.

5 Claims, 5 Drawing Figures ns 3,972,379

HYDROSTATICALLY DRIVEN VEHICLE

BACKGROUND OF THE INVENTION

1. Field of the Invention

This invention relates to automotive vehicles, and particularly to a four-wheel utility vehicle adapted to operate in a "forward" mode, which may be varied.

2. General Description of the Prior Art

There are applications both in material handling within industrial establishments and in rough or obstacle-laden terrain where there exists the need for a motorized vehicle which is capable of extreme maneuverability. Such a vehicle would be adaptable for, and capable of, a variety of hauling and service tasks. In the latter category, for example, it would provide an electrical generating means or other auxiliary work force, such as a high pressure air or hydraulic fluid.

It is the object of this invention to provide a vehicle which accomplishes the foregoing and other tasks.

SUMMARY OF THE INVENTION

A hydrostatically driven vehicle is constructed having four corner-positioned wheel assemblies, each being both driven and steered. Means are provided for steering any two of the wheels in unison, whereby the vehicle may be steered in any one of four directions.

DETAILED DESCRIPTION OF THE DRAWINGS

Figure 1:
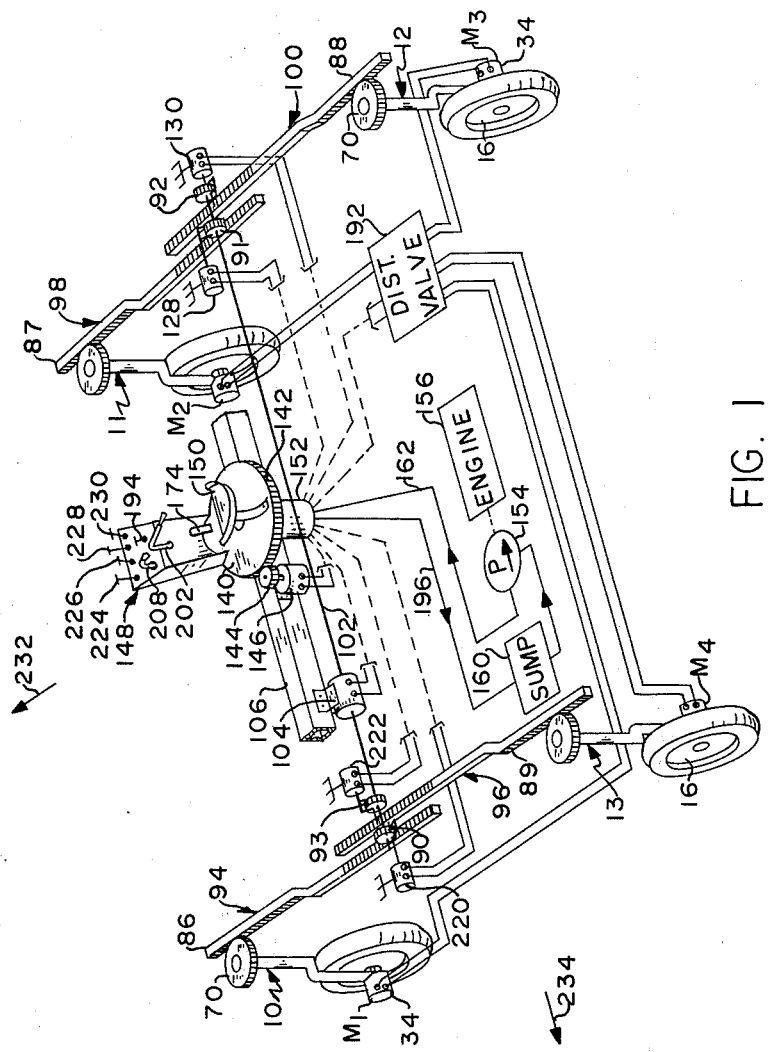
FIG. 1 is a combined pictoral-schematic illustration of the basic functional units of a vehicle constructed in accordance with the invention.
Figure 3:
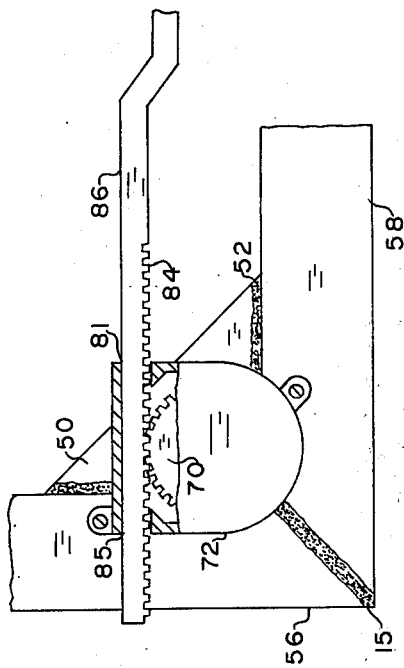
FIG. 3 is a plan view of the wheel assembly shown in FIG. 2.

Referring in detail to the drawings, FIG. 1 is a pictoral-schematic view of a hydrostatically driven vehicle constructed in accordance with the invention. The vehicle is a four-wheel drive type and it includes four similar wheel and suspension assemblies 10, 11, 12, and 13 which depend from a rectangular box-type frame 14, which is formed into a continuous tube by being joined as by weld 15 at each corner, as shown in FIGS. 2 and 3.

Figure 2:
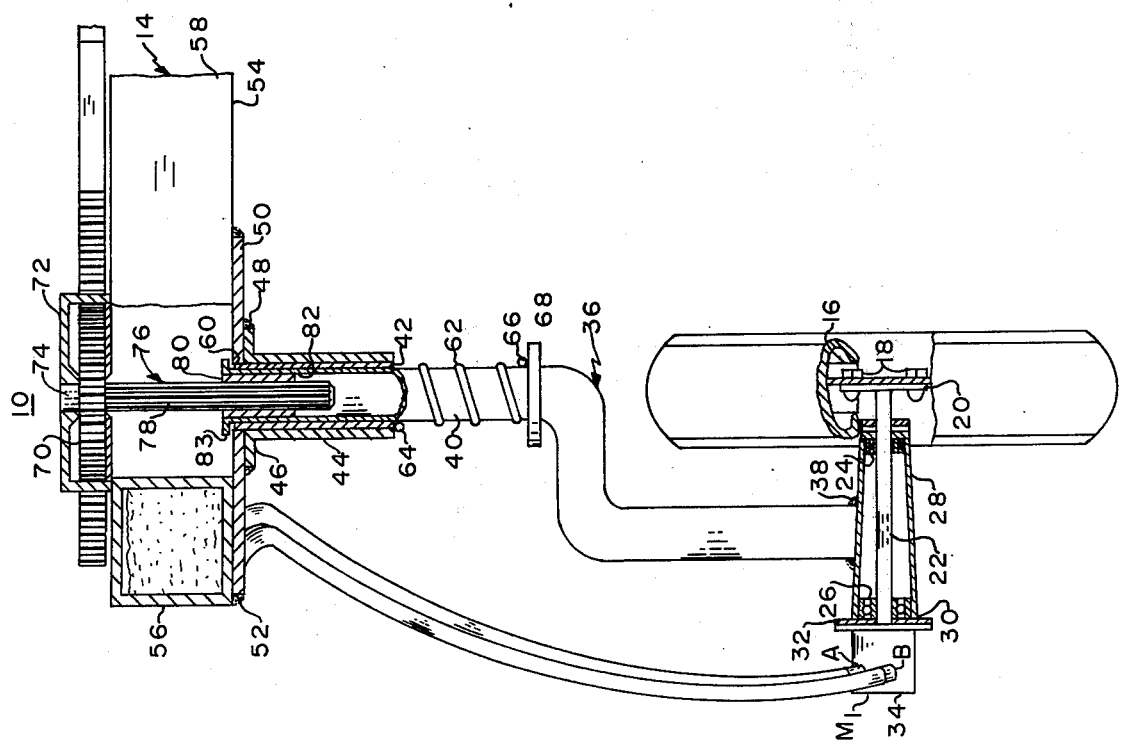
FIG. 2 is an elevational view, partly in section, of a wheel assembly as contemplated by the present invention.

FIG. 2 is an elevational view, partly in section, of one wheel and suspension assembly 10. Wheel 16 is attached by bolt and nut assemblies 18 to flange 20 at one end of drive axle 22. Drive axle 22 is rotatably supported by ball bearing assemblies 24 and 26 positioned near each end of conical-shaped bearing housing 28. At one end 30 bearing housing 28 is provided with flange 32 by which hydraulic drive motor 34 is mounted. The rotor of hydraulic motor 34 is coupled so as to rotate axle 22. Assembly 10 is supported by a Z-shaped tubular arm 36, the lower end 38 of which is centrally attached to bearing housing 28. The upper end region 40 of support arm 26 is rotatably and slidably journalled by low friction bearing 42, which is in turn supported by cylindrical housing 44. Housing 44 is terminated at its upper end by flange 46 which is secured as by weld 48 to a triangular plate 50. Triangular plate 50 (FIG. 3) is in turn secured as by weld 52 to the lower surface 54 of frame members 56 and 58. The upper end region 40 of Z-shaped arm 36 acts as a suspension member for drive wheel 16 and extends upward through opening 60 of triangular plate 50. Vehicle weight is supported by coil spring 62 retained about vertical member 40 and is supported at end 64 by the lower rim of cylindrical housing 44 and at opposite end 66 by a circular collar 68 secured about the lower end of vertical member 40. Wheel assembly 10 is steered by spur gear, or pinion, 70 enclosed within a protective housing 72 and which is firmly attached adjacent upper end region 74 of vertically disposed shaft 76. Each rack and spur assembly is adapted to rotate a wheel assembly up to approximately 180°. Upper end region 74 of shaft 76 is rotatably journalled within housing 72 and the lower end region 78 of shaft 76 is splined so as to engage a mating splined interior of circular insert 80. Insert 80 is firmly attached within the upper end region 82 of support member 40 and is provided with an upper flange 83 which limits the downward travel of wheel assembly 10. As is shown in FIG. 3, spur gear 70 is meshed with a toothed end region 84 of elongated rack member 86, which is slidably supported by aligned slots 81 and 85 formed in housing 72. Each of drive wheel support assemblies 10–13 is supported to frame 14 in the same manner as described with respect to assembly 10.

Figure 4:
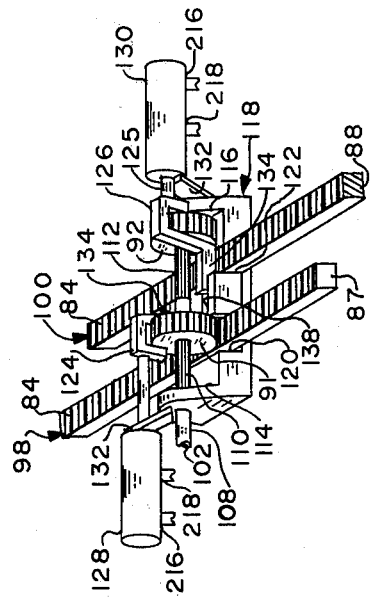
FIG. 4 is a pictoral view of a rack and pinion system employed to orient the wheels of the assembly for drive in any one of four directions.

Steering movement is applied to each of assemblies 10–13 by an associated rack and pinion assembly. Each of racks 86–89 is controlled by associated engagable pinions 90–93, respectively, (FIG. 1). Adjacent rack and pinion assemblies 94 and 96 on the left side of the vehicle as shown in FIG. 1, and rack and pinion assemblies 98 and 100 on the right side of the vehicle are supported as shown in FIG. 4 with respect to rack and pinion assemblies 98 and 100. Rotary motion is applied to pinions 91 and 92 by an elongated steering rod 102 which extends the width of the vehicle and which is rotated by a co-axially mounted hydraulic steering motor 104 supported to lateral frame 106. Pinions 91 and 92 are rotationally fixed on end region 108 of steering rod 102 but are slidably engaged with steering rod 102 through splined openings which are sized to mate with splined regions 110 and 112 of steering rod 102. Steering rod 102 is supported through aligned holes formed near the upper end of parallel upright arms 114 and 116 of mounting bracket assembly 118. Each of racks 87 and 88 is slidably supported within spaced slots 120 and 122, respectively, formed in the base of bracket assembly 118. Each of pinions 91 and 92 is slidably controlled by associated shifting forks 124 and 126, respectively, which are attached for lateral movement to piston rod 125 of hydraulic cylinders 128 and 130, respectively. Cylinders 128 and 130 are in turn mounted by brackets 132 to the upper ends of vertical arms 114 and 116 of bracket assembly 118. Clyinders 128 and 130 are bi-directional cylinders, and therefore reciprocal movement of the piston rods position pinions 91 and 92 into and out of engagement with racks 87 and 88, respectively. Laterally disposed locking lugs 134 and 136 are affixed near inwardly disposed ends of shifting forks 124 and 126 such that once a pinion is disengaged as illustrated in FIG. 4 with respect to pinion 92, locking lug 136 engages toothed region 84 of rack 88 and a portion of lateral slot 138 formed in bracket assembly 118 to slidably lock rack 88 in a selected position. A similar lug 134, fixed normal to fork 124 of pinion 91, locks rack 87 in a similar manner when pinion 91 is disengaged from rack 87. Mounting assembly 118 is attached to frame member 58 by means not shown.

Referring to FIG. 1, it is seen the operating position of the vehicle is disposed upon circular platform 140 which is centrally supported for rotation and which is connected by a toothed ring 142 to drive gear 144 which in turn is driven by hydraulic motor 146. Motor 146 is mounted to lateral frame 106. Control assembly 148 is disposed in an upright position and extends above rotary platform 140 so that various control levers may be operated from seat 150, which is supported by platform 140 at a point diametrically opposed to control assembly 148. Fluid interconnecting lines or conduits are preferably formed of flexible material and are routed upward through cylindrical column 152 to control assembly 148. This enables rotary platform 140 to be rotated through an approximate 270° arc and thus permit the operator to orient himself with the direction of travel of the vehicle.

Figure 5:
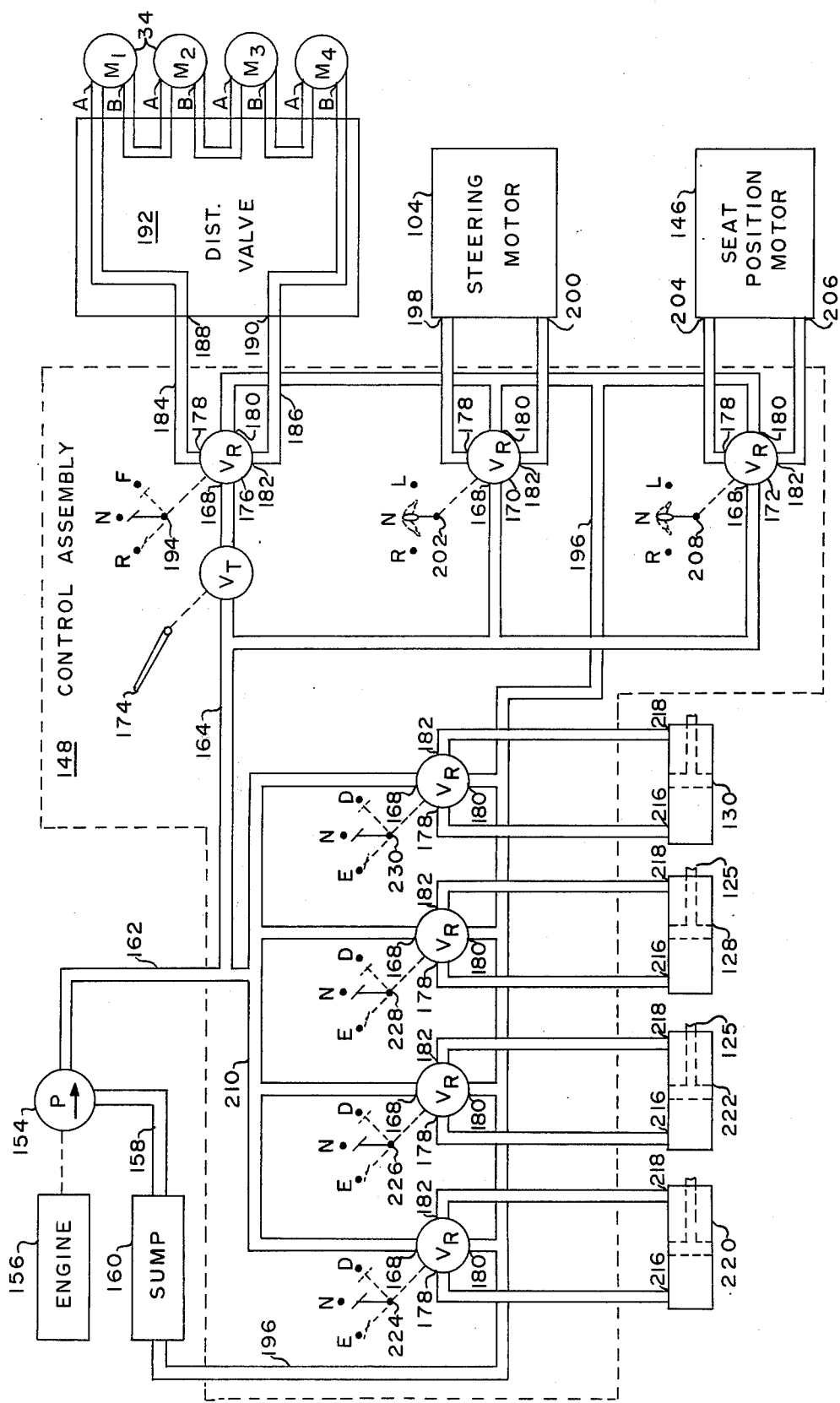
FIG. 5 is a schematic illustration of the hydraulic system of the invention.

FIG. 5 is a detailed schematic diagram of the hydraulic system of the vehicle. Hydraulic pump 154 is driven by a suitable engine 156, such as a gasoline engine or gas turbine, etc. The inlet side of pump 154 is connected through conduit 158 to the fluid outlet of sump 160. The discharge side of pump 154 is connected through conduit 162 to control assembly 148. Fluid flow is then directed through conduit 164 into throttle valve 166 and to inlet port 168 of reversing valves 170 and 172. Throttle valve 166 is controlled by foot lever 174 and supplies a selected volume of fluid to inlet port 168 of reversing valve 176.

Reversing valves 170, 172, and 176, further designated as $V_R$, are four-way valves in which a movable valve member, not shown, is ported such that all of the fluid directed into inlet port 168 may be directed through any one of three remaining ports 178, 180, and 182. When fluid is directed from port 168 to port 180, ports 178 and 182 are closed. A portion of the fluid entering port 168 may be directed through either of ports 178 or 182, while the balance of the fluid is discharged through port 180; and while fluid is being directed through either of ports 178 or 182, fluid may also be directed to port 180 from ports 178 or 182 not connected to port 168.

Ports 178 and 182 of valve 176 are connected through conduits 184 and 186 to ports 188 and 190, respectively, of distributor valve 192. Port 188 of distributor valve 192 is connected to the "A", or forward, port of one drive motor 34, further designated as $M_1$. The remaining drive motors 34, further designated as motors $M_2$, $M_3$, and $M_4$ (FIG. 1) are series connected with motor $M_1$, and the reverse port "B" of motor $M_4$ is connected to port 190 of distributor valve 192.

Valve 176 is controlled by lever arm 194, as schematically illustrated in FIG. 5. In the neutral position, designated "N", ports 178 and 182 are closed and all the fluid directed into port 168 is discharged through port 180 into return conduit 196. In the position marked "F", all the fluid directed into port 168 is directed out port 178 and through valve 192 to the forward port A of motor $M_1$. Fluid thus flows through motors $M_1$–$M_4$ to drive the vehicle in a forward direction. Fluid discharged from port B of motor $M_4$ is directed through port 182 and out of port 180 of valve 176 to return conduit 196. In the position marked "R", fluid flows into port B of motor $M_4$ and is discharged at port A of motor $M_1$, thence to port 178 of valve 176 and is discharged through port 180 to return conduit 196, thus driving motors $M_1$–$M_4$ in reverse. In the imtermediate positon of lever 194, variable amounts of fluid are alternately supplied to ports 188 and 190 of distributor valve 192 as a proportionate flow is discharged from the other port 188 or 190. Ports 178 and 182 of reversing valve 170 are connected to ports 198 and 200 of steering motor 104. Valve 170 is controlled by a rotary arm 202. In the position marked N, all the fluid directed into port 168 is discharged into return conduit 196 through port 180. In the "L" position, fluid flow is from port 178 through motor 104 and to port 182, being discharged through port 180 to return conduit 196. Motor 104 is thus driven in a clockwise direction (FIG. 1), which results in a steer left command to the vehicle, in a manner to be further described. When arm 202 is positioned to the R position, a reverse flow of fluid through motor 104 rotates motor 104 in a counterclockwise direction in order to effect a steer right command to the vehicle. Proportional rotation of motor 104 is effected by positioning arm 202 at selected intermediate positions between the N to L and N to R positions of arm 202.

Ports 178 and 182 of reversing valve 172 are connected to ports 204 and 206 of seat position motor 146. Valve 172 is controlled by a rotary arm 208 which functions in a similar manner to rotary arm 202, described above, to effect a right and left rotation command to platform 140 and thus to position an operator to any desired heading of the vehicle.

When rotary arm 208 is positioned to the L position, fluid flow is from port 178 through motor 146 and to port 182, being discharged through port 180 to return conduit 196. This flow direction results in a clockwise rotation of seat position motor 146 which positions platform 140 in a counterclockwise direction (FIG. 1). Conversely, when arm 208 is positioned to the R position, a reverse flow occurs in motor 146 which rotates motor 146 in a counterclockwise direction and platform 140 in a clockwise direction.

Fluid from the discharge side of pump 154 is directed through conduit 162 and branch conduit 210 to inlet ports 168 of reversing valves 212, 213, 214, and 215, which are each further designated as $V_R$. Ports 178 and 182 of valves 212–215 are connected to ports 216 and 218, respectively, of hydraulic cylinders 220, 222, 128, and 130, respectively. Valves 212–215 are similar to valves 170, 172, and 176, described above, and are operated in a similar manner by "three position" levers 224, 226, 228, and 230, respectively. With all levers in the "E" position (FIG. 5), all the fluid directed into an inlet port 168 is directed from port 178 and flows into port 216 of hydraulic cylinders 220, 222, 128, and 130. Piston rods 125 are thus extended to engage pinions 91–93 with the associated racks 86–89, respectively (FIG. 1). Fluid which is discharged from port 218 of each cylinder is directed through ports 182 and 180 to return conduit 196. Conversely, in order to disengage pinions 91–93, the levers are positioned to the "D" position, wherein fluid directed into ports 168 is directed out ports 182 and into ports 218 of the cylinders. Thus, piston rods 125 are retracted, disengaging pinions 91–93. Fluid discharged from port 216 of the cylinders flows through ports 178 and 180 to return conduit 196. With levers in the N, or neutral, position, ports 178 and 182 are closed and fluid directed into port 168 of each valve is directed from port 180 to return conduit 196.

With reference to FIG. 1, let it be assumed that it is desired to move the vehicle in a direction as indicated by arrow 232 and to steer the two wheel suspension assemblies 10 and 11. Once engine 156 is started and pump 154 supplies fluid under pressure to console 148, levers 226 and 230, which control hydraulic cylinders 222 and 130, respectively, are positioned as shown, which is the D, or disengaged, position. Fluid is thus directed to input 218 of each of cylinders 222 and 130 to retract rods 125 and thereby disengage pinions 93 and 92 from racks 89 and 88. Steering lever 202 is rotated to the right, or clockwise, position which causes steering motor 104 to rotate steering rod 102 in a counterclockwise direction; thus racks 86 and 87 are retracted and wheel assemblies 10 and 11 are turned in a clockwise direction to thus steer the vehicle to the right. Conversely, if steering lever 202 is torqued counterclockwise, steering motor 104 rotates in a clockwise direction and extend racks 86 and 87 imparting a counterclockwise rotation to wheel assemblies 10 and 11 and thus steer the vehicle to the left.

Assuming the vehicle is to move forward in the direction of arrow 232, then forward reverse lever 194 would be left in the F, or forward, position indicated on control console 148. When foot lever 174 is operated, fluid is directed to the A, or forward, ports of series connected drive motors $M_1$–$M_4$, and the vehicle then moves forward at a speed relative to the deflection of throttle control 174. When it is desired to halt the vehicle, throttle control 174 is released to the upward, or stationary, position, and reverse-neutral-forward valve 194 is slowly moved to the N, or neutral, position. In the neutral position, ports 178 and 182 of valve 176 (FIG. 5) are blocked, and thus the vehicle is braked to a stop condition. Assuming it is desired to drive the vehicle in a reverse direction, valve 194 is positioned from the neutral position toward the operator to the reverse position. Accelerator valve 194 is then depressed as desired to achieve the proper speed. To stop the vehicle, accelerator pedal 174 is again released, and reversing lever 194 is gradually moved to the neutral position, which brakes the vehicle to a stop.

To further illustrate how the vehicle may be driven in any direction with the operator oriented to face that direction, it is assumed that the vehicle is to be driven in the direction of arrow 234, which is a direction normal to the previous heading of the vehicle. With the vehicle in a braked position, steering lever 202 is operated in such a manner as to align the wheels directly ahead, as shown in FIG. 1. Levers 226 and 230 are then repositioned to the E position which reengages pinions 93 and 92 with racks 89 and 88, respectively. Steering lever 202 is then torqued counterclockwise until the wheels are aligned at a 90° position from that illustrated in FIG. 1. Platform 140 is then rotated such that the operator now faces the left arrow 234. To accomplish this, seat rotation lever 208 is torqued counterclockwise to cause motor 146 to turn the platform in a counterclockwise direction. Once the operator faces arrow 234, liver 208 is returned to the N, or neutral, position, and the operator now faces arrow 234. Assuming it is desired to steer wheel assemblies 10 and 13, which would, of course, be forward steering, both of levers 228 and 230 would be positioned to the D, or disengaged, positon (FIG. 5), disengaging pinions 91 and 92 from racks 87 and 88, respectively. It is to be readily seen that when steering lever 202 is torqued to the right, counterclockwise rotation of steering shaft 102 retracts rack 86 and extends rack 89 to turn vehicle assemblies 10 and 13 to the right of arrow 234. Conversely, if a left steering command is desired, steering lever 202 is turned counterclockwise to retract rack 88 and extend rack 86 which turns the wheels to the left of arrow 234.

From the above description, it is seen that regardless of what direction the operator faces, the appropriate rack and pinion may be engaged to effect steering in that direction. Further, it may readily be seen that all racks and pinions may be engaged and all four wheels positioned to move in any oblique direction as desired by an operator.

What is claimed is:

1. A rectangular configured automotive vehicle comprising:

first, second, third and fourth corner-positioned wheel assemblies, each assembly including an independently driven wheel motor and wheel driven by said motor, and further including means for rotating and positioning a said wheel assembly in azimuth, including a first pinion gear and rack drive coupling means including a first rack gear coupled to and driving said first pinion gear and a second rack gear attached to said first rack gear and adapted to be driven;

first steering drive means including a first drive pinion gear and selection means responsive to a first control input for selectively positioning said first drive pinion gear into and out of engagement with said second rack gear of said first wheel assembly;

said first steering drive means further including a second drive pinion gear and selection means responsive to a second control input for selectively positioning said second drive pinion gear into and out of engagement with said second rack gear of said second wheel assembly;

second steering drive means including a third drive pinion gear and selection means responsive to a third control input for selectively positioning said third drive pinion gear into and out of engagement with said second rack gear of said third wheel assembly;

Said second steering drive means further including a fourth drive pinion gear and selection means responsive to a fourth control input for selectively positioning said fourth drive pinion gear into and out of engagement with said second rack gear of said fourth wheel assembly; and control means for providing all four of said inputs or two of said inputs to two selected said selection means for selectively positioning drive pinion gears into engagement with second rack gears of adjacent said wheel assemblies, the adjacent wheel assemblies being wheel assemblies on one side of said vehicle.

2. A vehicle as set forth in claim 1 further comprising a platform and an operator's seat, said platform supporting said seat and said control means, and further comprising means for rotating a said platform and control means, whereby an operator may selectively adjust an operating position to a particular heading of the vehicle.

3. A vehicle as set forth in claim 2 including an engine and hydraulic pump driven by said engine, and wherein each said wheel motor comprises a hydraulic motor coupled to and driven by said hydraulic pump through said control means.

4. A vehicle as set forth in claim 3 wherein each said steering drive means comprises a hydraulic motor controlled by said control means, whereby said vehicle is hydraulically steered.

5. A vehicle as set forth in claim 4 wherein said vehicle includes a supporting frame, and the interior of said frame comprises a sump coupled to the flow output of said wheel motors through said control means, and an output of said sump is connected to an input of said hydraulic pump.

* * * * *